United States Patent [19]

Baron et al.

[11] Patent Number: 4,462,382

[45] Date of Patent: Jul. 31, 1984

[54] CIRCULAR SAW FOR CUTTING GREEN CONCRETE AND ASPHALT

[76] Inventors: Frank C. Baron; Kevin F. Baron; Kraig M. Baron, all of 24540 John Colter Rd., Hidden Hills, Calif. 91302

[21] Appl. No.: 509,291

[22] Filed: Jun. 30, 1983

[51] Int. Cl.³ ............................................. B24D 5/06
[52] U.S. Cl. ..................................... 125/15; 51/206.4
[58] Field of Search .................... 51/206 R, 206.4; 125/15; 76/101, 112; 407/61

[56] References Cited

U.S. PATENT DOCUMENTS

| | | | |
|---|---|---|---|
| 2,808,044 | 10/1957 | Upper et al. | 51/206 R |
| 2,958,240 | 11/1960 | Segal | 76/112 |
| 3,127,887 | 4/1964 | Metzger | 125/15 |
| 3,133,533 | 5/1964 | Sprague | 125/15 |
| 3,599,622 | 8/1971 | Baron | 125/15 |
| 3,763,601 | 10/1973 | Schwarzkopf | 51/206.4 |
| 3,820,419 | 6/1974 | McLogan | 76/112 |
| 3,973,455 | 8/1976 | Slaats et al. | 76/101 |
| 4,034,630 | 7/1977 | Norwak | 76/112 |
| 4,242,927 | 1/1981 | Oaks | 76/101 |
| 4,337,750 | 7/1982 | Dutcher | 125/15 |

FOREIGN PATENT DOCUMENTS 460669 12/1950 Italy ..................................... 407/61

Primary Examiner—Harold D. Whitehead
Attorney, Agent, or Firm—Perry E. Turner

[57] ABSTRACT

Slotted saw blades are shown with wide slots in which hardface inserts extend below the bottoms of the slots and interlock with the core, extend above the periphery of the core, and extend at a negative hook angle for the direction of core rotation. In various embodiments, the inserts, which are bonded to the core, include elements that are integral portions of the cutting segments, elements arranged in each slot so that one is at the negative hook angle for one direction of core rotation and the other is at the negative hook angle for the opposite direction of core rotation, and wedge shaped elements.

6 Claims, 6 Drawing Figures

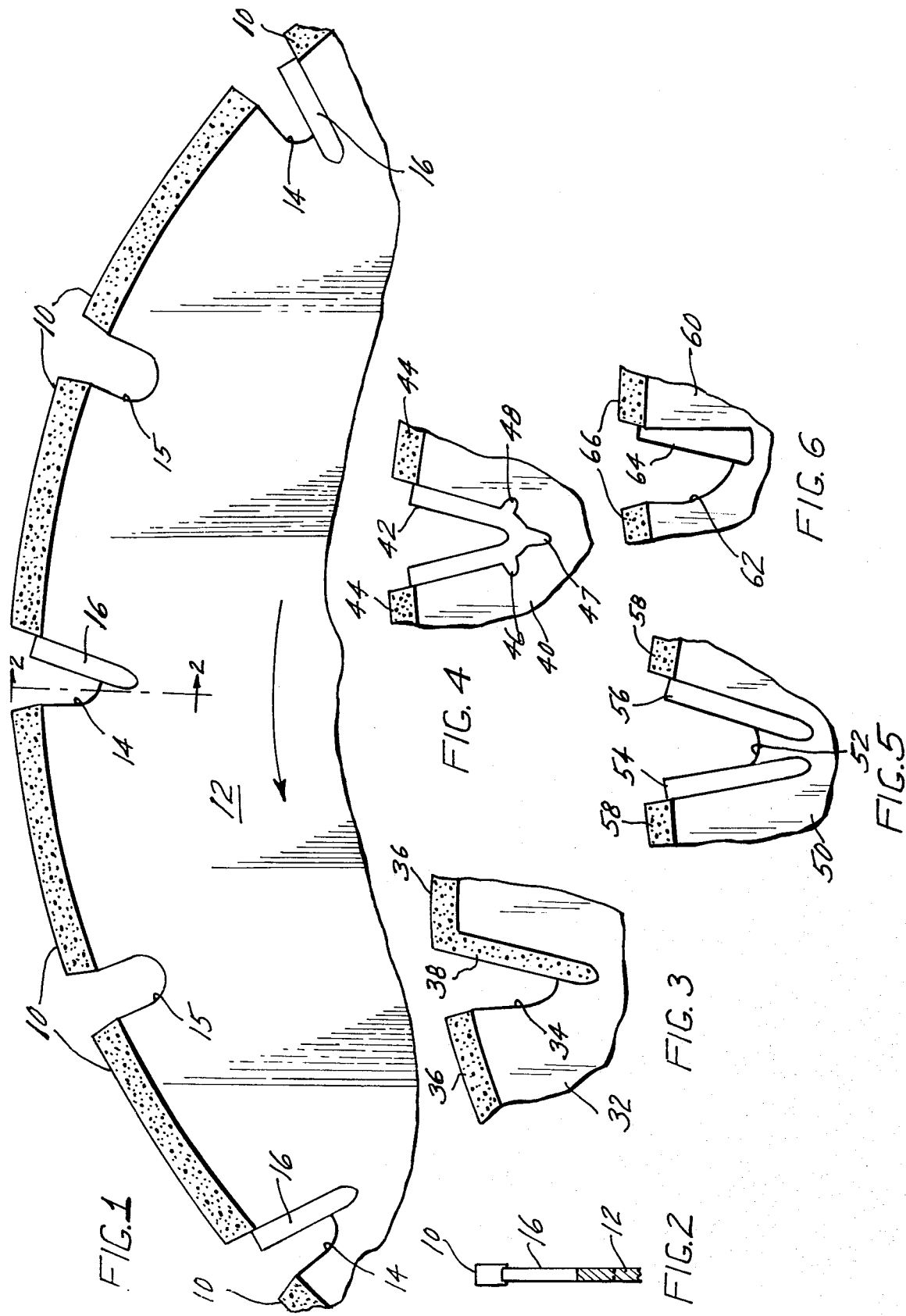

CIRCULAR SAW FOR CUTTING GREEN CONCRETE AND ASPHALT

BACKGROUND OF THE INVENTION

1. Field of the Invention

This invention relates to circular saws for cutting kerfs in green concrete and asphalt.

2. Description of the Prior Art

When concrete is poured for a roadway, it is common practice to make spaced, transverse cuts in the surface while the concrete is in its initial curing stage. Such cuts are narrow, cut are of sufficient wideth (e.g., 0.125-in.) and depth (e.g. 2.5-in.) to cause subsequent stresses from traffic to be directed downwardly instead of laterally. This inhibits surface cracking and deterioration, and helps prolong the life of the roadbed.

A typical saw used for the cutting has spaced cutting segments bonded to the periphery of the core. The core has radial slots, and each cutting segment extends between two adjacent slots. Also typically, such saws have hardened inserts bonded to one radial face of each slot. The purpose of the inserts is to minimize wear of the core so as to realize longer use of the cutting setments.

However, prior art saws still have the drawback that the cores are undercut below the bottoms of the slots, and also along the bottoms of the segments. This wear is progressive and results in an undesirably shortened life for the saw. Oftentimes the cutting segments, which typically include diamond particles, are still good enough for thousands of cutting operations. They must be salvaged by removing and bonding them to another core, and this is also an undesirably expensive process.

SUMMARY OF THE INVENTION

This invention embraces a slotted circular saw blade having spaced slots of substantial widths, with a hard face insert in each slot that extends at a negative hook angle with respect to the direction of core rotation, each such insert extending into the core well below the bottom of the slot and bonded to the core along its length so as to be interlocked and integral therewith, and at its upper end extending above the periphery of the slot. This invention also embraces a saw having cutting segments bonded to such core periphery between adjacent slots, wherein each insert is abutted by and bonded to the end of a segment. Also embraced are core structures in which the inserts are inwardly directed legs of cutting segments, as well as V-shaped and V-arranged inserts, and wedge shaped inserts.

BRIEF DESCRIPTION OF THE DRAWING

FIG. 1 is a fragmentary side elevation view of a circular saw in accordance with the invention, showing slots in which hard face inserts extend into and interlock with the core well below the bottoms of the slots and at a negative hook angle, and with the upper ends of the inserts extending above the core periphery to be abutted by and bonded to respective segments;

FIG. 2 is a fragmentary sectional view taken along the line 2—2 of FIG. 1;

FIG. 3 is a fragmentary side elevation view of another embodiment of a circular saw of the invention, wherein the hard face insert is formed of a leg of the cutting segment;

FIG. 4 is a fragmentary side elevation view of a further embodiment of the invention, showing provision for hardened inserts of V-shape so as to have both negative and positive hook angled legs, such that the corresponding legs on one side of the slots are at a negative angle for one direction of core rotation, and the other legs are at the negative hook for the opposite direction of core rotation;

FIG. 5 is a fragmentary side elevation view of an embodiment showing two separate hard face inserts on the opposite sides of each slot, to function in the same manner as the saw of FIG. 4; and FIG. 6 is a fragmentary side elevation view of an embodiment wherein the hard faced insert is a wedge shaped member.

DESCRIPTION OF ILLUSTRATIVE EMBODIMENTS

Referring to FIG. 1, diamond segments 10 are bonded to the periphery of a hardened saw steel circular core 12. The core 12 has spaced slots 14, 15 which are sufficiently wide that their widths and depths are comparable, or their widths are substantially large fractions of their depths. Such slot widths are substantially greater than those of slots heretofore employed for concrete and asphalt cutting saws.

In the arrangement illustrated, alternate slots 15 have their sides substantially parallel to radial lines through the centers of such slots. The other slots 14 also have one side which is parallel to such radial centerlines. However, the remaining sides of the slots 14 are constituted of lengths of hardened inserts 16 which are uniquely arranged.

In this regard, it will be noted that the inserts 16 are bars which at their outer ends extend past or above the core periphery. The lower ends of the inserts 16 extend into and interlock with the core, with the inner ends of the inserts being well below the bottoms of the slots. It will be understood that the core has grooves formed therein to receive the lower or inner ends of the inserts. The inserts fit tightly in nesting relation with the core, and are bonded in place as by conventional silver soldering techniques used in bonding the cutting segements 10 to the core periphery.

Importantly, in addition to the inserts extending above the core periphery and well below the bottoms of the slots, the inserts extend along lines that constitute negative hook angles with respect to the direction of rotation of the saw, i.e., an angle that is clockwise with respect to a radial line through the slot where the core rotation is counterclockwise.

The end faces of the cutting segments 10 extend along the same angle as the associated inserts 16. The cutting segments thus fit snugly against the outwardly extending portions of the inserts. This arrangement of intimate contact insures the bonding of the segments to the inserts so as to integrate the segments, inserts and core structurally.

With a saw blade construction as described, there are several unique, advantageous and beneficial results that obtain which are not apparent from and are significant advances over the prior art. Wear of the core 12 below the bottoms of the slots is inhibited. Wear of the core material at the leading edges of the cutting segments 10 is avoided. And the orientation of the leading faces of the inserts at the negative hook angle results in markedly improved pumping action to remove the slush from the kerf as the cuts are made by the saw.

Because of the minimized wear and effective pumping action, a saw with hard faced inserts and widened slots as above described had been found to have a useful life at least double that of known prior art saws. In one example, a 14-inch saw blade has slots approximately 9/16-in. deep. In such example, the slots 15 are 7/16-in. wide at the core periphery, and the slots 14, as defined with the inserts therein, are 5/16-in. wide at the core periphery. With sixteen diamond cutting segments bonded to the core periphery and to the projecting ends of the inserts, the saw was found to still be in good condition and able to cut green concrete after 60,000 in. ft. as compared to a conventional diamond cutting saw that had to be discarded after 30,000 in. ft.

While the saw structure described has hardened inserts located in alternate slots, it will be apparent that this invention embraces the provisions of such inserts in all slots. This lengthens the life of the blade still further, although it is somewhat more expensive to manufacture. Also, this invention embraces other arrangements of saw in which the above-mentioned criteria are met, as in the embodiments now to be described.

Referring to FIG. 3, a core 32 has slots 34 and cutting segments 36 wherein each segment has an integral leg 38 which extends into the core 32 well below the bottom of the slot 34. The leg 38, as with the inserts 16 previously described in FIGS. 1 and 2, extends at a negative hook angle for the direction of core rotation. Such a core, as with the previously described embodiment, provides the desired pumping action; wear of the core 32 below the bottoms of the slots 34 is prevented; and wear of the core at the bottoms of the cutting segments 36 is avoided.

FIGS. 4 and 5 illustrate saw structures of this invention which are adapted to function as desired regardless of the direction of rotation of the saw blade. Referring to FIG. 4, a core 40 has slots defined by hardened inserts 42 that are generally V-shaped, with the bottom of the V being rounded as indicated. As shown, the legs of the insert 42 extend above the periphery of the core 40, and are engaged by and bonded with the cutting segments 44, as in the manner of the inserts 16 of FIGS. 1 and 2. The inserts 42 are interlocked with the core 40, and to this end the insert may be provided with one or more suitable projections 46, 47, 48 which extend into and interlock with the core body. The core 40 is appropriately grooved to nestably receive the projections 46–48, and as with the inserts previously described, all portions of the inserts 42 in contact with the core are bonded thereto.

The legs of the inserts 42 are at the desired negative hook angles to establish the desired pumping action for core rotation in either direction. Thus, the left-hand legs of the inserts 42 are effective when the core is rotated clockwise. When the core is rotated counterclockwise, the right-hand legs of the inserts perform the desired pumping.

Referring to FIG. 5, a core 50 is shown wherein each slot 52 had inserts 54, 56 extending below the bottom of the slot and interlocking with the core 50. The upper ends of the inserts 54, 56 extend above the core periphery, and are abutted by and bonded to the cutting segments 58. As with the embodiment of FIG. 4, clockwise saw rotation has pumping done by the left hand inserts 54. The inserts 56 perform the pumping when the blade is rotated counterclockwise.

FIG. 6 illustrates a still further embodiment of the invention. In this embodiment, a core 60 has slots 62 wherein wedge shaped inserts 64 define one side of the slot. In this arrangement, the trailing edge of the insert 64 extends along the side of the slot that is formed in the core, but with its lower end extending well below the bottom of the slot 62. The leading edge of the insert 64 is at the desired negative hook angle.

In this embodiment, since the trailing side of the insert is parallel to the radial line through the center of the slot, the upper end of the insert is shaped to conform to the adjacent portion of the cutting segment 66. When positioned as shown in FIG. 6, the inserts 64 are bonded in place. In cutting operations, the leading edge of the insert provides the desired pumping, and the inwardly and outwardly extending portions of the inserts inhibit wear below the bottoms of the slots and at the bottoms of the cutting segments.

It will be apparent that this invention is not limited to the particulars shown and described, but embraces saw blades with additional or auxiliary provisions, and varying dimensions for the elements and materials employed. Examples of such variations embraced by this invention include inserts of different lengths wherein their inner ends extend to different distances within the core below the slots; and hardened inserts or face material are provided in the core at locations other than the slots. This invention also embraces inserts made of various compositions, including tungsten carbide, diamond particles, ceramics, stelite or the like, to be interlocked and bonded in place as described.

We claim:

1. In combination:
   a circular core having a plurality of spaced slots extending inwardly from its periphery,
   each of said slots having a width that is a large fraction of its depth,
   said core being adapted to have cutting segments bonded to its periphery and extending between adjacent slots;
   respective bar inserts of wear resistant material in respective slots,
   the upper end of each insert extending outwardly from the periphery of said core, the inner end of each insert extending into said core substantially below the bottom of the associated slot so as to interlock in face-to-face contact with said core, and each insert having an outer face extending along a negative hook angle with reference to the intended direction of rotation of said core,
   the opposite face of each insert being in face-to-face contact with said core, and each insert being bonded to said core throughout its face-to-face contacts with said core.

2. The combination of claim 1, including cutting segments bonded to the periphery of said core,
   each insert having its upper end abutting one end of a respective cutting segment and being bonded thereto.

3. The combination of claim 1, including cutting segments bonded to the periphery of said core,
   and each insert being constituted of a portion of a respective cutting segment,
   said portions being legs extending at said angle.

4. The combination of claim 1, wherein said inserts are in pairs,
   the inserts of each pair extending along converging lines such that one insert is at a negative hook angle for one direction of rotation of said core, and the other insert is at a negative hook angle for the rotation of the core in the opposite direction.

5. The combination of claim 4, wherein each pair of inserts is comprised of a V-shaped member, said member having one or more projections which extend into and interlock with said core.

6. The combination of claim 1, wherein each insert is a wedge shaped element, the leading edge of which is at said negative hook angle.

* * * * *